(12) United States Patent
Khoshkava et al.

(10) Patent No.: US 10,452,146 B2
(45) Date of Patent: *Oct. 22, 2019

(54) ELECTROSTATIC ADHESIVE BASED HAPTIC OUTPUT DEVICE

(71) Applicant: IMMERSION CORPORATION, San Jose, CA (US)

(72) Inventors: Vahid Khoshkava, Montreal (CA); Juan Manuel Cruz Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,822

(22) Filed: Aug. 6, 2018

(65) Prior Publication Data

US 2018/0348874 A1 Dec. 6, 2018

Related U.S. Application Data

(63) Continuation of application No. 15/072,485, filed on Mar. 17, 2016, now Pat. No. 10,042,424.

(51) Int. Cl.
*G06F 3/041* (2006.01)
*G06F 3/01* (2006.01)

(52) U.S. Cl.
CPC ............ *G06F 3/016* (2013.01); *G06F 3/0414* (2013.01); *G06F 3/0416* (2013.01); *G06F 2203/04102* (2013.01); *G06F 2203/04108* (2013.01)

(58) Field of Classification Search
CPC ...... G06F 3/016; G06F 3/0416; G06F 3/0414; G06F 2203/04102; G06F 2203/04108
See application file for complete search history.

(56) References Cited

U.S. PATENT DOCUMENTS

2014/0251701 A1 9/2014 Prahlad et al.
2014/0368993 A1* 12/2014 Sun .................. G06F 1/1656
361/679.55

(Continued)

FOREIGN PATENT DOCUMENTS

EP 2 953 006 A1 12/2015
EP 2 963 522 A1 1/2016

(Continued)

OTHER PUBLICATIONS

Any information that are not included with this information Disclosure Statement can be found in U.S. Appl. No. 15/072,485.

(Continued)

*Primary Examiner* — Nelson M Rosario
*Assistant Examiner* — Andrew Lee
(74) *Attorney, Agent, or Firm* — Medler Ferro Woodhouse & Mills PLLC (57) ABSTRACT

A haptic output device includes a substrate, an array of electrodes disposed on the substrate, and a layer of dielectric material disposed on the array of electrodes. The layer of dielectric material has an exposed outer surface comprising a micro-patterned texture configured to increase adhesion between the exposed outer surface and a contact surface in contact with the exposed outer surface. The haptic output device includes a controller configured to direct a voltage potential across the array of electrodes to generate an electrostatic adhesive force between the exposed outer surface and the contact surface as a haptic effect.

13 Claims, 5 Drawing Sheets

(56) References Cited

U.S. PATENT DOCUMENTS

| | | | |
|---|---|---|---|
| 2015/0005039 A1* | 1/2015 | Liu .................. | H04M 1/72569 |
| | | | 455/567 |
| 2015/0116218 A1* | 4/2015 | Yang ...................... | G06F 21/31 |
| | | | 345/158 |
| 2016/0239143 A1 | 8/2016 | Song | |
| 2016/0318190 A1* | 11/2016 | Prahlad ............... | B25J 15/0085 |
| 2016/0370862 A1* | 12/2016 | Colgate .................. | G06F 3/016 |

FOREIGN PATENT DOCUMENTS

| | | | | |
|---|---|---|---|---|
| WO | 2015/095826 A1 | 6/2015 | | |
| WO | WO 2015095826 A1 * | 6/2015 | .......... | B25J 15/0085 |

OTHER PUBLICATIONS

Extended European Search Report dated Aug. 11, 2017 in corresponding European Patent Application No. 17 161 275.7.

Ruffatto, III, Donald et al., "Improving controllable adhesion on both rough and smooth surfaces with a hybrid electrostatic/gecko-like adhesive," J. R. Soc. Interface 11. http://dx.doi.org/10.1098/rsif.2013.1089.

Communication pursuant to Article 94(3) EPC issued in European Application No. 17161275.7, dated Feb. 19, 2019.

* cited by examiner

ELECTROSTATIC ADHESIVE BASED HAPTIC OUTPUT DEVICE

CROSS-REFERENCE TO RELATED APPLICATIONS

This application is a continuation of prior U.S. application Ser. No. 15/072,485, filed on Mar. 17, 2016, which is hereby incorporated by reference in its entirety for all purposes.

FIELD

The present invention is directed to an electrostatic adhesive based haptic output device and an electronic device that incorporate an electrostatic adhesive based haptic output device.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate vibration effects, many devices utilize some type of actuator or haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys. Haptic output devices also broadly include non-mechanical or non-vibratory devices such as those that use electrostatic friction ("ESF"), ultrasonic surface friction ("USF"), or those that induce acoustic radiation pressure with an ultrasonic haptic transducer, or those that use a haptic substrate and a flexible or deformable surface, or those that provide projected haptic output such as a puff of air using an air jet, and so on.

Pub. No.: US 2014/0251701 A1 discusses about electrostatic adhesion and how it is converted into an application like robotics (wall climbing robot). Electrostatic adhesion has been one of the fundamental force for centuries but recently has received much attention.

Smart electronic devices, such as smartphones are becoming thinner and thinner, but typical electromagnetic based motors that are used to control movements of parts of the devices are relatively bulky and noisy. It is desirable to control forces between moving bodies of smart electronic devices without using conventional motors and actuators. It is also desirable to provide haptic feedback in the next generation of smart electronic devices that are thin and/or flexible.

SUMMARY

According to an aspect of the invention, there is provided a haptic output device includes a substrate, an array of electrodes disposed on the substrate, and a layer of dielectric material disposed on the array of electrodes. The layer of dielectric material has an exposed outer surface comprising a micro-patterned texture configured to increase adhesion between the exposed outer surface and a contact surface in contact with the exposed outer surface. The haptic output device includes a controller configured to direct a voltage potential across the array of electrodes to generate an electrostatic adhesive force between the exposed outer surface and the contact surface as a haptic effect.

In an embodiment, the substrate includes thermoplastics, thermosets and elastomeric materials, which could include a material selected from the group consisting of: polymethylsiloxane, polyvinylidene fluoride, polyethylene terephthalate, polystyrene, and polypropylene.

In an embodiment, the substrate is a flexible film.

In an embodiment, the layer of dielectric material includes a dielectric material selected from the group consisting of: parylene and silicon dioxide.

According to an aspect of the invention, there is provided an electronic device that includes a sensor configured to sense an action of a user of the electronic device, and a haptic output device configured to generate a haptic effect in response to the action of the user sensed by the sensor. The haptic output device includes a substrate, an array of electrodes disposed on the substrate, and a layer of dielectric material disposed on the array of electrodes, the layer of dielectric material having an exposed outer surface comprising a micro-patterned texture configured to increase adhesion between the exposed outer surface and a contact surface in contact with the exposed outer surface. The electronic device includes a controller configured to receive an input signal from the sensor, to determine the haptic effect to be generated by the haptic output device based on the input signal, and to direct a voltage potential across the array of electrodes to generate an electrostatic adhesive force between the exposed outer surface and the contact surface as the haptic effect.

In an embodiment, the sensor is a proximity sensor or a pressure sensor.

In an embodiment, the electronic device includes a housing, and the haptic output device is mounted to the housing. In an embodiment, the haptic output device is mounted on an outside surface of the housing.

In an embodiment, the electronic device includes a rotary knob configured to be rotated by the user of the electronic device, and the rotary knob includes the contact surface.

In an embodiment, the controller is further configured to receive an indication that the electronic device has received an e-mail or text message, and to determine the haptic effect based on the indication and the input signal.

According to an aspect of the invention, there is provided a method for generating a haptic effect with a haptic output device. The method includes receiving an input signal from a sensor configured to sense an action of a user of an electronic device with a controller, determining the haptic effect to be generated by the haptic output device based on the input signal with the controller, and directing a voltage potential across an array of electrodes of the haptic output device to generate an electrostatic adhesive force between an exposed outer surface of the haptic output device and a contact surface as the haptic effect.

In an embodiment, the method includes receiving an indication that the electronic device has received an e-mail or text message with the controller, and the haptic effect is determined by the controller based on the indication and the input signal.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
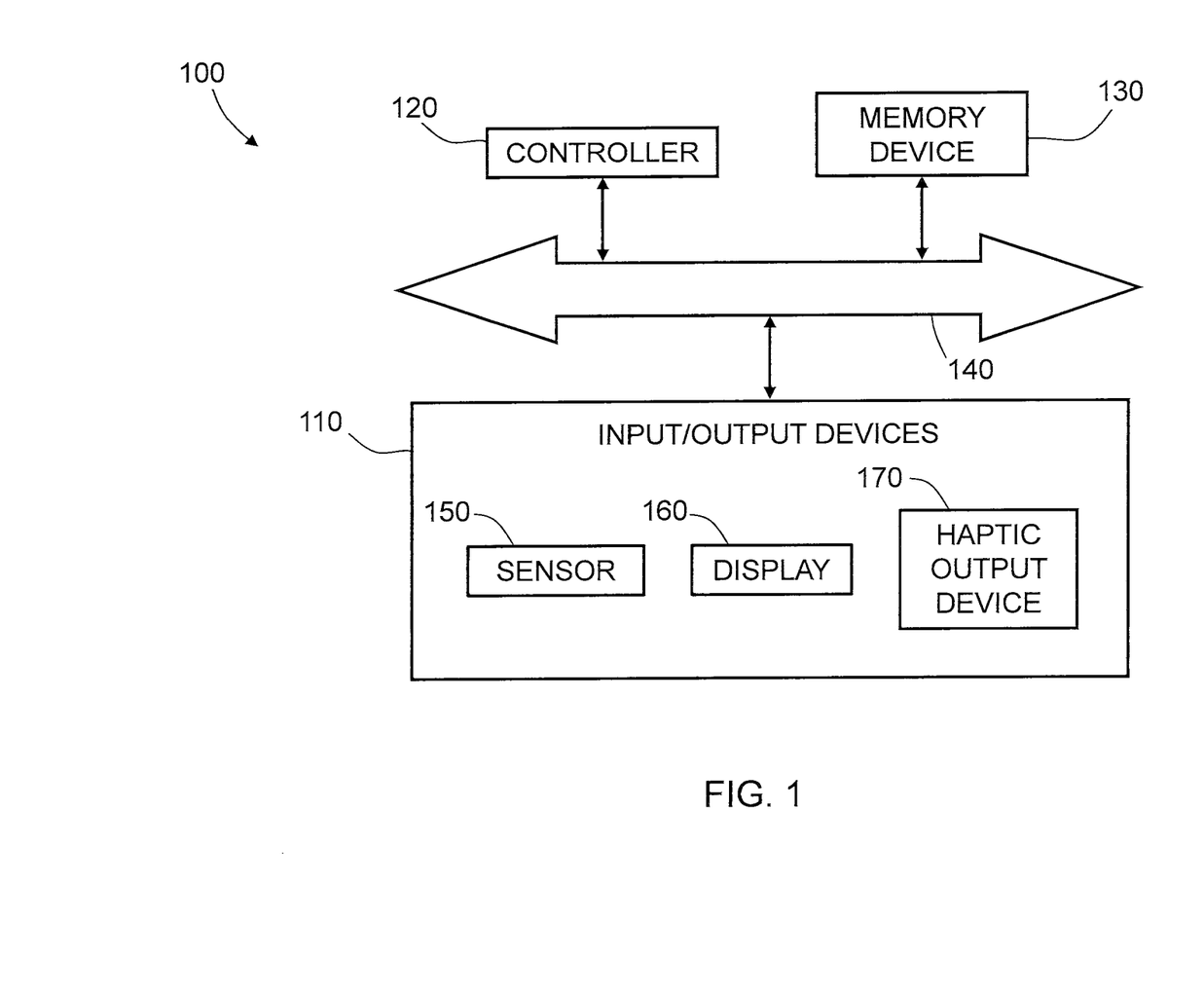
FIG. 1 schematically illustrates an electronic device in accordance with embodiments of the invention.

FIG. 1 illustrates an electronic device 100 in accordance with an embodiment of the invention. The electronic device 100 may include or be part of a desktop computer, laptop computer, electronic workbook, electronic handheld device (such as a mobile phone, smartphone, gaming device, personal digital assistant ("PDA"), portable e-mail device, portable Internet access device, calculator, etc.), kiosk (such as an automated teller machine, ticket purchasing machine, etc.), printer, point-of-sale device, game controller, wearable device, or other electronic device, such as an electronic device that is part of a vehicle, such as a touch screen, touch pad, or button panel.

As illustrated, the electronic device 100 includes input/output devices 110, a controller 120, and a memory device 130. The input/output devices 110 may be interconnected to the controller 120 and/or the memory device 130 via a bus 140 such that the input/output devices 110 are in signal communication with the controller 120. The bus 140 may include wired communication links, wireless communication links, and/or other communication links between the controller 120 and the input/output devices 110. Signals may be output by the input/output devices 110 to the controller 120 and signals may be output by the controller 120 to the input/output devices 110.

The input/output devices 110 may include at least one user input device configured to receive an input from the user of the electronic device 100. In an embodiment, the user input device may include a sensor 150 configured to sense an input from the user. The sensor 150 may be in the form of a touch sensor and configured to detect gestures from the user, such as tapping, sliding, rubbing, or pressing a surface of the sensor 150. Several technologies may be used for this purpose, such as capacitive or resistive sensing, force-sensitive resistors, or optical switches, for example. In an embodiment, the sensor 150 may be part of a touch pad. In an embodiment, the sensor 150 may be part of a touch screen that overlays a display 160 configured to output and display information to the user. In an embodiment, the sensor 150 and the display 160 may be combined into a touch screen device. In an embodiment, the sensor 150 may be in the form of a proximity sensor or a presence sensor that is configured to detect a user's action toward the electronic device 100. The electronic device 100 may include a plurality of sensors that have different functionalities.

The input/output devices 110 may include an audio output device (not shown), such as a speaker, that is configured to provide audio feedback to the user. In an embodiment, the input/output devices 110 may include other types of user input devices, such as a button, a rotary knob, or a joystick that may be manipulated by the user in order for the user to provide input to the electronic device 100. Buttons, rotary knobs and joysticks are currently used, for example, as user input devices in a variety of gaming peripherals and vehicles and implementations of such devices are known to one of ordinary skill in the art.

The input/output devices 110 also include a haptic output device 170 configured to provide a haptic effect or feedback to the user as, for example, confirmation that an input was received by the electronic device 100. The haptic output device 170 may include one or more actuators, driving circuitry, and a haptic engine configured to generate driving signals for the actuator(s).

As illustrated in FIG. 1, the memory device 130 may also be interconnected with the controller 120 and to the input/output devices 110 via the bus 140. The memory device 130 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 170 is to be driven, or other information for generating haptic effects.

Figure 2:
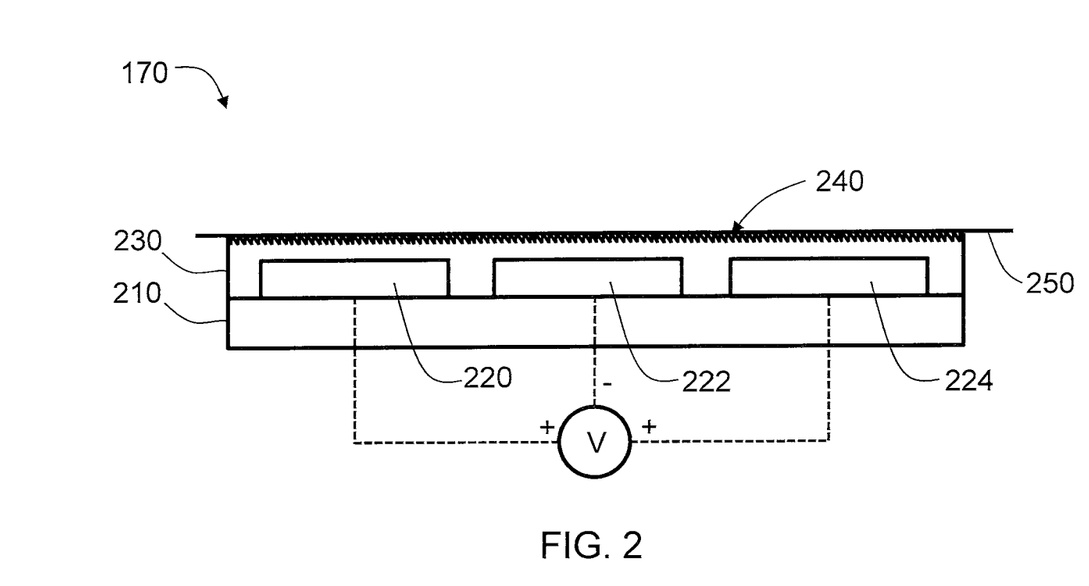
FIG. 2 schematically illustrates an embodiment of a haptic output device of the electronic device of FIG. 1.
Figure 3:
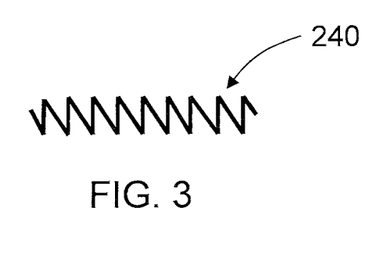
FIG. 3 schematically illustrates a detailed view of a portion of an outer micro-patterned surface of the haptic output device of FIG. 2.

FIG. 2 schematically illustrates a cross-section of the haptic output device 170 in accordance with an embodiment of the invention. Fabrication of the haptic output device 170 involves electro-patterning and surface engineering, as described in further detail below. As illustrated, the haptic output device 170 includes a substrate 210, a plurality of electrodes 220, 222, 224 disposed on an upper surface of the substrate 210, a dielectric material layer 230 disposed on and in between the electrodes 220, 222, 224, and a micro-patterned outer surface 240 on a side of the dielectric material 230 that is opposite the substrate 210. The electrodes 220, 222, 224 are in signal communication with a voltage source V, which may be controlled by the controller 120. FIG. 3 illustrates a more detailed view of a portion of the micro-patterned outer surface 240.

The substrate 210 may be a thin layer of silicone or a thin and/or flexible polymer film made from, for example, an organic insulator, an inorganic insulator, polydimethylsiloxane (PDMS), polyvinylidene fluoride (PVDF), polyethylene terephthalate (PET), polystyrene (PS), polypropylene (PP), etc. The electrodes 220, 222, 224, which may be part of a larger array of electrodes that are circular or rectangular in shape, may be patterned on the substrate 210 using sputtering or vapor deposition methods. Different conductive metals, such as Au, Al, Cr, Cu, Ag, carbon nanotubes, graphite, semiconductor, etc., may be used for the electrodes 220, 222, 224. The dielectric material 230 may be deposited onto the electrodes 220, 222, 224 and the substrate 210. In an embodiment, the dielectric material 230 may encapsulate the electrodes 220, 222, 224. The dielectric material layer 230 may include a dielectric material, such as parylene, silicon dioxide, etc.

In order to increase the effective surface area of the outer surface 240 of the dielectric material layer 230, the outer surface 240 may be micro-patterned by using ion beam fusion, soft lithography or micro-fabrication techniques, such as positive and negative molding techniques, casting techniques, or surface etching techniques, such as laser etching, etc. Such techniques may be used to create nano/micro-patterned surfaces from plastics (conductive or non-conductive) or metals. These techniques may be applied directly to the dielectric material layer 230 or to a separate substrate that may then be bonded or glued to the dielectric material layer 230. An example of a fabrication technique that may be used to fabricate an embodiment of the haptic output device 170 is described in "Improving controllable adhesion on both rough and smooth surfaces with a hybrid electrostatic/gecko-like adhesive," by D. Ruffatto III, et al. in the Journal of the Royal Society Interface 11: 20131089 (2014), which is incorporated herein by reference in its entirety. The microstructure created in the outer surface 240 may include a plurality of microwedges, as illustrated in FIG. 3. In an embodiment, the microstructure may include a plurality of fibrils or other elements that have high surface areas. In an embodiment, the microstructure may be configured to mimic the microstructure of a foot of a gecko and considered to be a gecko-like microstructure.

In embodiments in which the micro-patterned surface 240 is not created in the dielectric material layer 230, a very thin layer of a dielectric material may be deposited on the surface as an insulator. By micro- (or nano-) patterning the outer surface 240, the interaction between the outer surface 240 and another surface 250 in contact with the outer surface 240 may be increased without applying an electric field to the electrodes 220, 222, 224. The patterning could include features such as polyhedral, micro pillar, spherical dots, etc.

In yet another embodiment related to FIGS. 2 and 3, in addition to or in lieu of the surface pattering to increase the contact area between the two contact areas as described herein one can achieve a similar or improved effect by increasing the applied voltage, so effectively increasing the attraction forces between the two contact areas. The voltages could be in the range of few hundreds to thousands volts depending on the dielectric material's thickness and dielectric strength value. Generally, the higher the voltage, the larger the force.

When a voltage potential is provided to the electrodes 220, 222, 224 by the voltage source V, an electrostatic adhesive force may be generated between the outer surface 240 of the haptic output device 170 and the surface 250 in contact with the outer surface 240 such that a user of the electronic device 100 may feel an increase in adhesion between the surfaces 240, 250 as a haptic effect.

Returning to FIG. 1, the controller 120 may be a general-purpose or specific-purpose processor or microcontroller for managing or controlling the operations and functions of the electronic device 100. For example, the controller 120 may be specifically designed as an application-specific integrated circuit ("ASIC") to control output signals to the display 160 to provide visual information and to the haptic output device 170 to provide haptic effects. In some embodiments, the controller 120 may be part of the haptic output device 170. The controller 120 may be configured to determine, based on predefined factors, the type(s) of haptic effect(s) to be generated, the order in which the haptic effects are generated, and the magnitude, frequency, duration, and/or other parameters of the haptic effects. The controller 120 may also be configured to provide streaming commands that can be used to drive the haptic output device 170 for providing a particular haptic effect. In some embodiments, the controller 120 may actually include a plurality of processors, each configured to perform certain functions within the electronic device 100.

Figure 4:
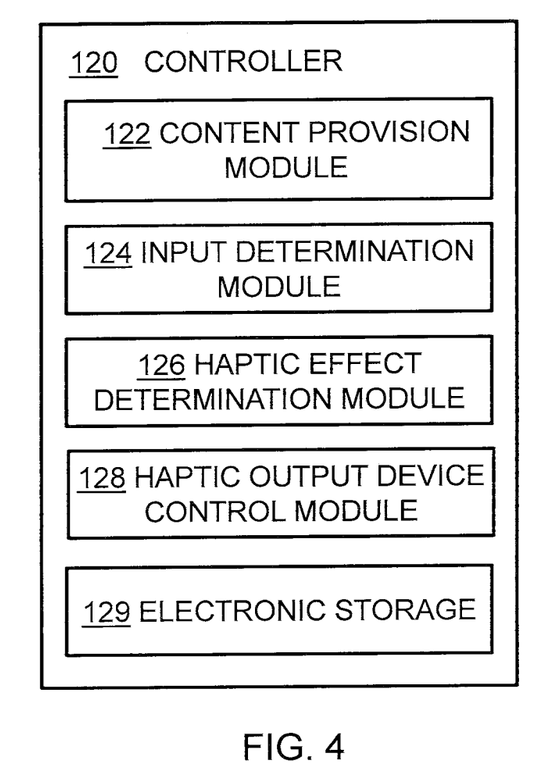
FIG. 4 schematically illustrates an embodiment of a controller of the electronic device of FIG. 1.

FIG. 4 illustrates a more detailed view of an embodiment of the controller 120. The controller 120 may be configured to execute one or more computer program modules. The one or more computer program modules may include one or more of a content provision module 122, an input determination module 124, a haptic effect determination module 126, a haptic output device control module 128, and/or other modules. The controller 120 may be configured to execute the modules 122, 124, 126, and/or 128 by software, hardware, firmware, some combination of software, hardware, and/or firmware, and/or other mechanisms for configuring processing capabilities on the controller 120.

It should be appreciated that although modules 122, 124, 126, and 128 are illustrated in FIG. 4 as being co-located within a single processing unit, in embodiments in which the controller 120 includes multiple processing units, one or more of modules 122, 124, 126, and/or 128 may be located remotely from the other modules. The description of the functionality provided by the different modules 122, 124, 126, and/or 128 described below is for illustrative purposes, and is not intended to be limiting, as any of the modules 122, 124, 126, and/or 128 may provide more or less functionality than is described. For example, one or more of the modules 122, 124, 126, and/or 128 may be eliminated, and some or all of its functionality may be provided by other ones of the modules 122, 124, 126, and/or 128. As another example, the controller 120 may be configured to execute one or more additional modules that may perform some or all of the functionality attributed below to one of the modules 122, 124, 126, and/or 128.

The content provision module 122 is configured to control the provision of content to the user of the electronic device 100 via the display 160. If the content includes computer generated images, the content provision module 122 is configured to generate the images and/or views for display to the user through the display 160. The content, or information from which the content is derived, may be obtained by the content provision module 122 from an electronic storage 129, which may be part of the controller 120, as illustrated in FIG. 4, or may be separate from the controller 120, such as part of the memory device 130 illustrated in FIG. 1.

The input determination module 124 is configured to receive an input signal from the sensor 150. The input signal is generated when the sensor 150 detects an action of a user of the electronic device 100, which may be a touch input by the user or the user approaching the electronic device, i.e. the sensor 150 sensing the user is in proximity of the sensor 150. The input determination module 124 may be configured to determine whether the sensed action is an intentional action or merely an inadvertent action, such as an inadvertent touch to the sensor 150 or an inconsequential passing of the user by the sensor 150, by comparing the strength of the input signal to a predetermined threshold strength that corresponds to an intentional action. The input determination module 124 is also configured to determine what was intended by the user when providing an input to the sensor 150 or taking an action toward the electronic device 100. For example, the user may touch a certain location of the sensor 150 or provide a particular gesture to the sensor 150 that indicates that a certain function is to be performed by the electronic device 100. The input determination module 124 may be programmed with a library of predetermined gestures and touch locations on the sensor 150 so that when the user touches a particular location on the sensor 150 or provides a gesture to the sensor 150, the input determination module 124 may determine a corresponding output.

For example, in an embodiment in which the electronic device 100 is in the form of a smartphone, the user may draw a symbol on the sensor 150 with his or her finger and the input determination module 124 may determine that the drawn symbol corresponds to a particular command, such as unlocking the smartphone so that the user may freely interact with the smartphone. In embodiments in which the sensor 150 is a proximity or presence sensor, the determination module 124 may be programmed to determine a corresponding output based on a duration of time that the sensor 150 senses the user in proximity to the sensor 150.

In an embodiment, the input determination module 124 may be configured to receive a signal from a remote device, such as a timer, that provides an input to indicate that a haptic effect is to be generated, instead of or in addition to the signal received from the sensor 150. In addition, the input determination module 124 may also output a signal to the haptic effect determination module 126 and/or the haptic output device control module 128 so that a haptic effect verifying the input has been detected and/or accepted may be provided to the user.

The haptic effect determination module 126 is configured to determine the haptic effect or sensation to be generated by the haptic output device 170 and output to the user of the electronic device 100. Determining the haptic effect may include determining the type of haptic effect and one or more parameters of the haptic effect, such as amplitude, frequency, duration, etc.

The haptic output device control module 128 is configured to control the haptic output device 170 to generate the haptic effect determined by haptic effect determination module 126. This includes communicating a haptic output signal generated by the controller 120 to the haptic output device 170 via the bus 140. In an embodiment, at least a portion of the functionality attributed to the haptic output device control module 128 may be disposed in a controller or processor carried by the haptic output device 170.

The haptic output device 170 in accordance with embodiments of the invention may be used in the electronic device 100 in a variety of implementations. In an embodiment, the sensor 150 may be used to detect a user's action towards an electronic device 100 that includes the haptic output device 170 so that electro-adhesion may be activated by the haptic output device 170 to create a haptic effect. For example, when the electronic device 100 is a smartphone and a user of the smartphone drags or lifts the smartphone and feels increased friction/adhesion between the smartphone and the contact surface underneath the smartphone, the haptic effect may indicate to the user that there is an unread e-mail or text message or a missed call.

Figure 5:
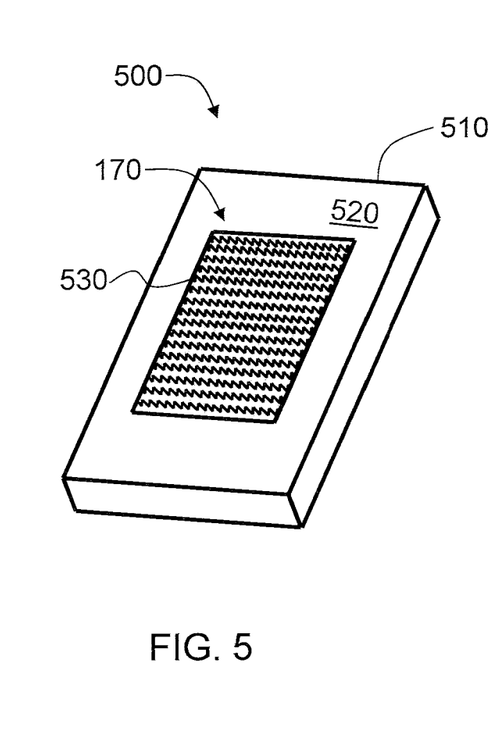
FIG. 5 is a schematic perspective view of an embodiment of the electronic device of FIG. 1.

In an embodiment of an electronic device 500 illustrated in FIG. 5, the haptic output device 170 may be applied to a housing 510 or case for the electronic device 500, and the electronic device 500 may be a smartphone. For example, the haptic output device 170 described above may be applied on a back side 520 of the housing 510 of the electronic device 500 as a patch 530. In an embodiment, the user of the electronic device 500 may feel increased adhesion between the electronic device 500 and an underlying contact surface when the user grabs the electronic device 500, which means that the user has received a new e-mail or text message, for example. In an embodiment, the user of the electronic device 500 may directly touch the patch 530 and feel increased adhesion between the electronic device 500 and the user's skin when the user grabs the electronic device, which means that the user has received a new e-mail or text message, for example.

In an embodiment, the haptic output device 170 may be provided to an inside surface of a cover for the housing and when user attempts to open the cover and feels an increased adhesion between the cover and the housing or the smartphone, the user may be notified that he/she has a new e-mail or text message, or has missed a call.

Figure 6:
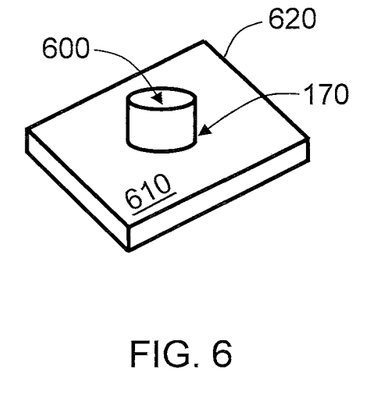
FIG. 6 is a schematic perspective view of an embodiment of the electronic device of FIG. 1.

In an embodiment illustrated in FIG. 6, the haptic output device 170 may be implemented in conjunction with a rotary knob 600 to control the friction/adhesion of the rotary knob 600 with an underlying surface. In the illustrated embodiment, the haptic output device 170 is provided on a top surface 610 of a housing 620, underneath the rotary knob 600. In an embodiment, the haptic output device 170 may be provided to an outer surface of the rotary knob 600. The haptic effect provided to the user turning the rotary knob 600 may be in the form of increased adhesion/friction when the user turns the rotary knob 600 in a wrong direction. Other haptic effects include detents, barrier and bumps.

In an embodiment, the haptic output device 170 may be applied on the corners of a laptop screen to control its adhesion with the base part of the laptop when the user opens the laptop. When the user feels the resistance provided by the haptic output device 170, the user may realize that he/she has not finished drafting an e-mail or forgot to hit the send button to send an e-mail. In an embodiment, the haptic output device 170 may be implemented underneath a computer mouse so that its adhesion with a mouse pad or a supporting surface may be controlled to generate a haptic effect to the user. Embodiments of the invention may be implemented in applications in which there is a need to move (e.g., up and down, sliding, folding, lifting, dragging, etc.) one or two parts relative to each other in an electronic device such that controlling the adhesion/friction between the electronic device and a surface contacting the haptic output device 170 may be used to provide notifications to the user.

In addition to the haptic output device 170 described above, the electronic device 100 may include multiple haptic output devices as part of the input/output devices 110, and additional haptic feedback may be created with any of the methods of creating haptic effects, such as vibration, deformation, kinesthetic sensations, electrostatic or ultrasonic friction, etc. In an embodiment, an additional haptic output device may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electroactive polymers, such as ionic or electronic based electroactive polymers, shape memory materials, smart hydrogels, a macrocomposite fiber actuator, an electrostatic actuator, an electrotactile actuator, a nanocomposite actuator, a pneumatic-based actuator and/or another type of actuator that provides a physical feedback such as vibrotactile feedback. The additional haptic output device may include non-mechanical or non-vibratory devices such as those that use electrostatic friction (ESF), ultrasonic friction (USF), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on.

Figure 7:
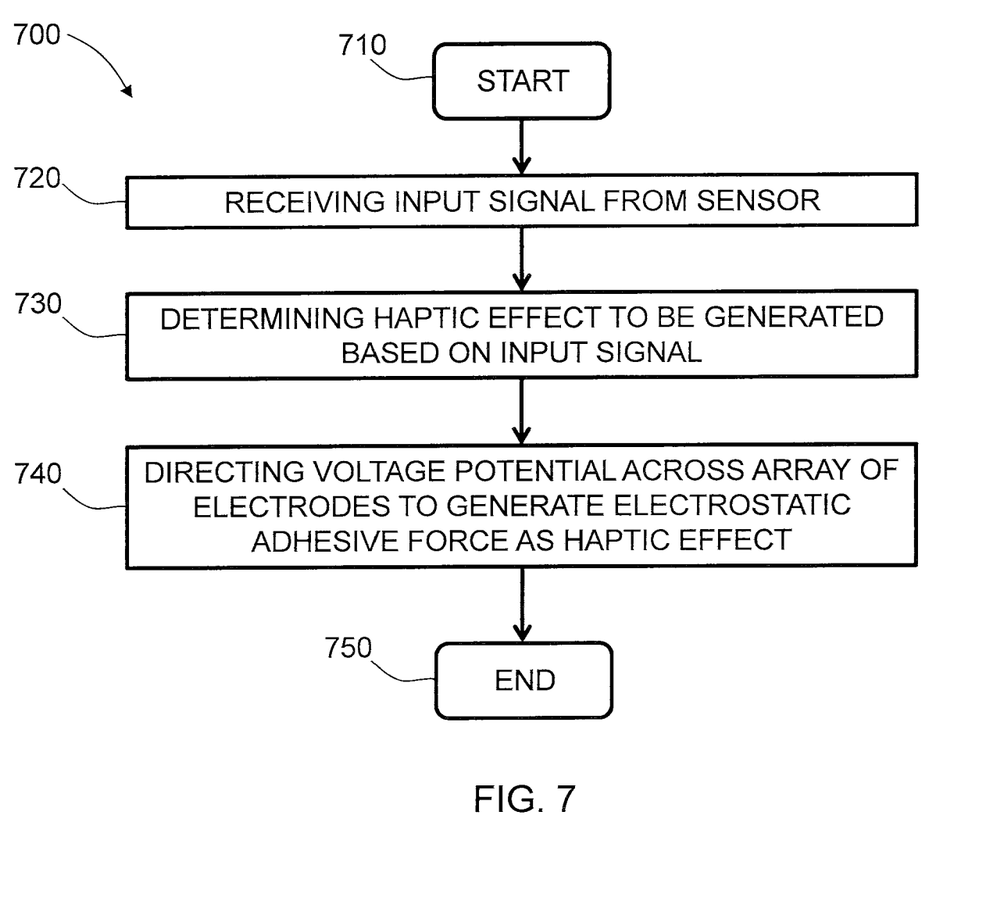
FIG. 7 schematically illustrates a method for providing a haptic effect to a user of the electronic device of FIG. 1.

FIG. 7 illustrates a method 700 for generating a haptic effect with a haptic output device, such as the haptic output device 170 described above, in accordance with embodiments of the invention. As illustrated, the method starts at 710. At 720, the method includes receiving an input signal from a sensor configured to sense an action of a user of an electronic device with a controller. The sensor may be the sensor 150 described above, and the controller may be the controller 120 described above. At 730, the method includes determining the haptic effect to be generated by the haptic output device based on the input signal with the controller. At 740, the method includes directing a voltage potential across an array of electrodes of the haptic output device to generate an electrostatic adhesive force between an exposed outer surface of the haptic output device and a contact surface as the haptic effect. The method ends at 750. In an embodiment, the method also includes receiving an indication that the electronic device has received an e-mail or text message with the controller, and the haptic effect is determined by the controller based on the indication and the input signal.

Other embodiments of an electrostatic adhesive based haptic output device and an electronic device that incorporate an electrostatic adhesive based haptic output device could be in contact surfaces, as confirmation effect. In one example, when the user touches the touch sensitive surface, to confirm the user action the effect is activated and the user will feel a sticky surface or nothing if the interaction was not registered.

The embodiments described herein represent a number of possible implementations and examples and are not intended to necessarily limit the present disclosure to any specific embodiments. Various modifications can be made to these embodiments as would be understood by one of ordinary skill in the art. Any such modifications are intended to be included within the spirit and scope of the present disclosure and protected by the following claims.

All US Patents and US Patent Application Publications mentioned in the application are incorporated herein in their entirety.

What is claimed is:

1. An electronic device comprising:
 a display;
 a housing coupled to the display and having an outside surface opposite the display;
 a substrate configured as a patch applied to the outside surface of the housing, the substrate including:
  an array of electrodes disposed on the substrate, and
  a layer of dielectric material disposed on the array of electrodes, the layer of dielectric material having an exposed outer surface configured to increase adhesion by an electroadhesive effect between the exposed outer surface and a contact surface in contact with the exposed outer surface when the array of electrodes is activated with a voltage potential; and
 a controller configured to direct a voltage potential across the array of electrodes to generate an electrostatic adhesive force between the exposed outer surface and the contact surface as the electroadhesive effect.

2. The electronic device of claim 1, wherein the controller is further configured to generate a user notification and determine the electroadhesive effect to output the user notification.

3. The electronic device of claim 2, further comprising a sensor configured to sense an action of a user of the electronic device,
 wherein the controller is further configured to:
  receive an input signal from the sensor indicative of the action of the user, and
  output the user notification based on the input signal.

4. The electronic device of claim 3, wherein the sensor is a proximity sensor or a pressure sensor.

5. The electronic device of claim 2, wherein the controller is further configured to receive an indication that the electronic device has received an e-mail or text message, and to generate the user notification according to the indication.

6. A user notification device comprising:
 a patch configured for application to a housing of an electronic device, the patch including
  a substrate,
  an array of electrodes disposed on the substrate, and
  a layer of dielectric material disposed on the array of electrodes, wherein the array of electrodes is configured to receive a voltage potential to generate an electrostatic adhesive force between an exposed outer surface of the layer of dielectric material and a contact surface in contact with the exposed outer surface to thereby increase adhesion between the exposed outer surface and the contact surface in contact with the exposed outer surface,
 wherein the patch having the substrate, the array of electrodes, and the layer of dielectric material is configured for mounting to an outside surface of the housing opposite a screen of the housing, and wherein the substrate is configured to receive a signal from a controller of the electronic device to generate the voltage potential across the array of electrodes.

7. The user notification device according to claim 6, wherein the substrate comprises a material selected from a group consisting of: polymethylsiloxane, polyvinylidene fluoride, polyethylene terephthalate, polystyrene, polypropylene, and combinations thereof.

8. The user notification device according to claim 6, wherein the substrate is a flexible film.

9. The user notification device according to claim 6, wherein the substrate comprises a thermoplastic material, a thermoset material, an elastomer or combinations thereof.

10. An electronic device comprising:
 a rotary knob configured to be rotated by a user;
 an electroadhesive device provided on an outer surface of the rotary knob and configured to generate an electroadhesive effect, the electroadhesive device comprising:
  a substrate,
  an array of electrodes disposed on the substrate, and
  a layer of dielectric material disposed on the array of electrodes, the layer of dielectric material having an exposed surface configured to increase adhesion by an electroadhesive effect between the exposed surface and a contact surface in contact with the exposed surface when the array of electrodes is activated with a voltage potential, wherein the rotary knob is further configured to receive a control signal from a controller configured to determine the electroadhesive effect and, in response to the control signal, direct a voltage potential across the array of electrodes to generate an electrostatic adhesive force between the exposed surface and the rotary knob as the electroadhesive effect.

11. The electronic device of claim 10, further comprising a housing comprising the contact surface and configured to contain the controller.

12. The electronic device of claim 10, wherein the electroadhesive effect includes increased adhesion when the user turns the rotary knob in a wrong direction.

13. The electronic device of claim 10, wherein the electroadhesive effect includes at least one of a detent, a barrier, and a bump.

* * * * *